(12) United States Patent
Pung et al.

(10) Patent No.: US 8,881,336 B2
(45) Date of Patent: Nov. 11, 2014

(54) CLEANING SUBSTRATE

(75) Inventors: David John Pung, Loveland, OH (US); Edward Philip Allie, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1765 days.

(21) Appl. No.: 11/601,238

(22) Filed: Nov. 17, 2006

(65) Prior Publication Data

US 2007/0107151 A1    May 17, 2007

Related U.S. Application Data

(60) Provisional application No. 60/737,823, filed on Nov. 17, 2005.

(51) Int. Cl.
| | |
|---|---|
| *A47L 13/16* | (2006.01) |
| *B23B 5/02* | (2006.01) |
| *A47L 13/20* | (2006.01) |
| *B08B 1/00* | (2006.01) |
| *B26F 1/24* | (2006.01) |
| *B32B 3/30* | (2006.01) |
| *B32B 27/12* | (2006.01) |

(52) U.S. Cl.
CPC . *B23B 5/02* (2013.01); *A47L 13/16* (2013.01); *A47L 13/20* (2013.01); *B08B 1/00* (2013.01); *B26F 1/24* (2013.01); *B32B 3/30* (2013.01); *B32B 27/12* (2013.01)
USPC ......... 15/228; 15/104.94; 15/104.93; 15/208; 15/209.1

(58) Field of Classification Search
USPC ........ 15/104.93, 228; 119/28.5; 428/131, 137
See application file for complete search history.

(56) References Cited

U.S. PATENT DOCUMENTS

| | | | |
|---|---|---|---|
| 3,929,135 A * | 12/1975 | Thompson | ............... 604/385.08 |
| 4,076,663 A | 2/1978 | Masuda et al. | |
| 5,550,167 A | 8/1996 | DesMarais | |
| 5,563,179 A | 10/1996 | Stone et al. | |
| 5,779,155 A | 7/1998 | Schennum et al. | |
| 5,960,508 A | 10/1999 | Holt et al. | |
| 5,968,029 A | 10/1999 | Chappell et al. | |
| 6,003,191 A | 12/1999 | Sherry et al. | |
| 6,048,123 A | 4/2000 | Holt et al. | |
| 6,101,661 A | 8/2000 | Policicchio et al. | |
| 6,242,074 B1 * | 6/2001 | Thomas | ........................ 428/137 |
| 6,305,046 B1 | 10/2001 | Kingry et al. | |
| 6,436,080 B1 * | 8/2002 | Carlucci et al. | .......... 604/385.01 |
| 6,491,928 B1 * | 12/2002 | Smith, III | ..................... 424/401 |
| 6,601,261 B1 | 8/2003 | Holt et al. | |
| 2002/0166573 A1 | 11/2002 | Policicchio et al. | |
| 2002/0168216 A1 | 11/2002 | Policicchio et al. | |
| 2003/0034050 A1 | 2/2003 | Policicchio et al. | |
| 2003/0095826 A1 | 5/2003 | Policicchio et al. | |
| 2003/0126708 A1 | 7/2003 | Blum et al. | |
| 2003/0126709 A1 | 7/2003 | Policicchio et al. | |

(Continued)

*Primary Examiner* — Monica Carter
*Assistant Examiner* — Stephanie Berry
(74) *Attorney, Agent, or Firm* — Larry L. Huston; Steven W. Miller (57) ABSTRACT

A cleaning substrate (1) comprising an absorbent layer (2); a surface layer (3) comprising a macro-apertured laminate (31) of a thermoplastic formed film (32) and a nonwoven layer (33); wherein said thermoplastic formed film (32) is in direct contact with said absorbent layer (2), and said macro-apertured laminate (31) has a thickness (35) of from 0.5 mm to 1.5 mm.

12 Claims, 3 Drawing Sheets

(56) References Cited

U.S. PATENT DOCUMENTS

| | | |
|---|---|---|
| 2003/0126710 A1 | 7/2003 | Policicchio et al. |
| 2003/0133740 A1 | 7/2003 | Policicchio et al. |
| 2004/0086320 A1* | 5/2004 | Policicchio et al. .......... 401/138 |
| 2004/0161586 A1* | 8/2004 | Cree et al. .................... 428/131 |
| 2005/0076936 A1 | 4/2005 | Pung et al. |
| 2005/0215459 A1 | 9/2005 | Policicchio et al. |

* cited by examiner

CLEANING SUBSTRATE

CROSS REFERENCE TO RELATED APPLICATION

This application claims the benefit of U.S. Provisional Application No. 60/737,823, filed on Nov. 17, 2005.

FIELD OF THE INVENTION

The present invention relates to an improved cleaning substrate. The cleaning substrate is suitable for the cleaning of hard surfaces, such as the cleaning of floors. The present invention also relates to a cleaning kit comprising a cleaning implement and a cleaning substrate, and to a method of cleaning hard surfaces.

BACKGROUND OF THE INVENTION

Numerous cleaning systems are known for the cleaning of hard surfaces such as tiled floors, linoleum floors, hardwood floors, counter tops, and the like. One type of cleaning system that has gained a lot of popularity over the last few years due to its improved convenience and ease-of-use, is a cleaning system which comprises a cleaning implement, a liquid delivery system for delivering a cleaning composition, and a cleaning substrate. The cleaning implement typically has a handle which is connected to a mop head. A cleaning substrate is removably attached to the mop head. In use, a cleaning composition is delivered to the hard surface in front of the mop head, and the mop head with the cleaning substrate attached to it, is moved over the hard surface in order to clean the surface, and to absorb dirt and excess cleaning solution. One example of such a cleaning system is Swiffer Wetjet®, sold by the Procter & Gamble Company.

Various types of cleaning substrates are available. They can be durable and re-usable, such as textile cloths, or they can be disposable. Disposable cleaning substrates have the advantage that, after a single cleaning operation, they can simply be discarded. Disposable cleaning substrates exist as single-layer substrates, or as multi-layer substrates. The single-layer substrates are typically made of a nonwoven material, and generally provide sufficient dirt removal capabilities, but are not able to absorb large amounts of liquid. Multi-layered substrates, on the other hand, are designed for dirt removal and the absorption of large amounts of liquid into an absorbent layer. Existing surface layers (the layer which contacts the hard surface during the cleaning operation) of multi-layered cleaning substrates are either thin apertured, thermoplastic films, or high basis weight nonwovens.

Thin apertured, thermoplastic films provide the benefit of quick transport of liquid and dirt into the absorbent layer where it is stored such that it can not be released back to the hard surface. But due to planar nature of the film, the capability of removing tough soil is reduced, especially on textured surfaces.

High basis weight nonwovens provide the benefit of providing increased surface area which is in contact with the hard surface, and thus are better in removing tough soil. These nonwovens also provide desirable visual aesthetics over the thermoplastic films. However, due to the thickness of these high basis weight nonwovens, they possess a relatively large capillary pore volume, making it difficult to effectively transfer the liquid to the absorbent layer.

The present invention overcomes the negatives of the prior art, and provides a cleaning substrate having improved tough soil removal and liquid handling capabilities.

SUMMARY OF THE INVENTION

According to the present invention, there is provided a cleaning substrate comprising
a. an absorbent layer;
b. a surface layer comprising a macro-apertured laminate of a thermoplastic formed film and a nonwoven layer, wherein said thermoplastic formed film is in direct contact with said absorbent layer; and wherein said macro-apertured laminate has a thickness of from 0.5 mm to 1.5 mm.

In a second embodiment, there is provided a cleaning kit for cleaning a hard surface, comprising a cleaning implement comprising a mop head, and a cleaning substrate comprising
a. an absorbent layer;
b. a surface layer comprising a macro-apertured laminate of a thermoplastic formed film and a nonwoven layer, wherein said thermoplastic formed film is in direct contact with said absorbent layer; and wherein said macro-apertured laminate has a thickness of from 0.5 mm to 1.5 mm.

In a third embodiment, there is provided a method of cleaning a hard surface.

DETAILED DESCRIPTION OF THE INVENTION

Definitions:

As used herein, the term "X-Y dimension" refers to the plane orthogonal to the thickness of the cleaning substrate, or a component thereof. The X and Y dimensions usually correspond to the length and width, respectively, of the cleaning substrate or a component thereof.

As used herein, the term "layer" refers to a member or component of a cleaning substrate whose primary dimension is X-Y, i.e., along its length and width. It should be understood that the term "layer" is not necessarily limited to single layers or sheets of material. Thus the layer can comprise laminates or combinations of several sheets or webs of the requisite type of materials. Accordingly, the term "layer" includes the terms "layers" and "layered."

For purposes of the present invention, an "upper" layer of a cleaning substrate is a layer that is relatively further away from the surface that is to be cleaned (i.e., in the implement context, relatively closer to the implement handle during use). The term "lower" layer conversely means a layer of a cleaning substrate that is relatively closer to the surface that is to be cleaned (i.e., in the implement context, relatively further away from the implement handle during use).

The cleaning substrate of the present invention, or components thereof, may comprise nonwoven fibers. The term nonwoven is to be defined according to the commonly known definition provided by the "Nonwoven Fabrics Handbook" published by the Association of the Nonwoven Fabric Industry. As used herein, a "nonwoven layer" is a layer comprising nonwoven fibers and made according to methods as described herein below. To be clear, the definitions of nonwoven layers or nonwoven substrates do not include woven fabric or cloth or sponge.

Nonwoven fibers comprise fibers that are naturally occurring (modified or unmodified), as well as synthetically made fibers, or combinations thereof. Natural fibers include all those, which are naturally available without being modified, regenerated or produced by man and are generated from plants, animals, insects or by-products of plants, animals and insects. Examples of suitable unmodified/modified naturally occurring fibers include cotton, Esparto grass, bagasse, kemp, flax, silk, wool, wood pulp, chemically modified wood pulp, jute, ethyl cellulose, cellulose acetate, and combinations thereof. As used herein, "synthetic" means that the materials are obtained primarily from various man-made materials or from natural materials that have been further altered. Non-limiting examples of synthetic materials useful in the present invention include those selected from the group consisting of acetate fibers, acrylic fibers, cellulose ester fibers, modacrylic fibers, polyamide fibers, polyester fibers, polyolefin fibers, polyvinyl alcohol fibers, rayon fibers and combinations thereof. Examples of suitable synthetic materials include acrylics such as acrilan, creslan, and the acrylonitrile-based fiber, orlon; cellulose ester fibers such as cellulose acetate, amel, and acele; polyamides such as nylons (e.g., nylon 6, nylon 66, nylon 610, and the like); polyesters such as fortrel, kodel, and the polyethylene terephthalate fiber, polybutylene terephalate fiber, dacron; polyolefins such as polypropylene, polyethylene; polyvinyl acetate fibers and combinations thereof. These and other suitable fibers and the nonwovens prepared therefrom are generally described in Riedel, "Nonwoven Bonding Methods and Materials," Nonwoven World (1987); The Encyclopedia Americana, vol. 11, pp. 147-153, and vol. 26, pp. 566-581 (1984). Suitable synthetic materials may include solid single component (i.e., chemically homogeneous) fibers, multi-constituent fibers (i.e., more than one type of material making up each fiber), and multi-component fibers (i.e., synthetic fibers which comprise two or more distinct filament types which are somehow intertwined to produce a larger fiber), and combinations thereof. Bi-component fibers may have a core-sheath configuration or a side-by-side configuration. Suitable bi-component fibers for use in the present invention can include sheath/core fibers having the following polymer combinations: polyethylene/polypropylene, polyethylvinyl acetate/polypropylene, polyethylene/polyester, polypropylene/polyester, copolyester/polyester, and the like. Particularly suitable bi-component thermoplastic fibers for use herein are those having a polypropylene or polyester core, and a lower melting copolyester, polyethylvinyl acetate or polyethylene sheath (e.g., those available from Danaklon a/s, Chisso Corp., and CELBOND®, available from Invista). These bi-component fibers can be concentric or eccentric. As used herein, the terms "concentric" and "eccentric" refer to whether the sheath has a thickness that is even, or uneven, through the cross-sectional area of the bi-component fiber. Eccentric bi-component fibers can be desirable in providing more compressive strength at lower fiber thicknesses. Preferred bi-component fibers comprise a copolyolefin bi-component fiber comprising less than about 81% polyethylene terephthalate core and a less than about 51% copolyolefin sheath. The amount of bi-component fibers will preferably vary according to the density of the material in which it is used.

Methods of making nonwovens are well known in the art. Generally, these nonwovens can be made by air-laying, water-laying, meltblowing, coforming, spunbonding, or carding processes in which the fibers or filaments are first cut to desired lengths from long strands, passed into a water or air stream, and then deposited onto a screen through which the fiber-laden air or water is passed. The resulting layer, regardless of its method of production or composition, is then subjected to at least one of several types of bonding operations to anchor the individual fibers together to form a self-sustaining substrate. Suitable processes include, but are not limited to, air-entanglement, hydro-entanglement, thermal bonding, carding, needle-punching, or any other process known in the art, and combinations of these processes.

As used herein, the term "disposable" means that the cleaning substrate and all components thereof are designed for use for only a limited number of times (e.g. about 1-3 times), and typically even for a single time, and are then preferably discarded, opposed to durable cleaning substrates (e.g. textile cleaning cloths or sponges) which are typically used for an extended period of time and multiple usages.

Figure 1:
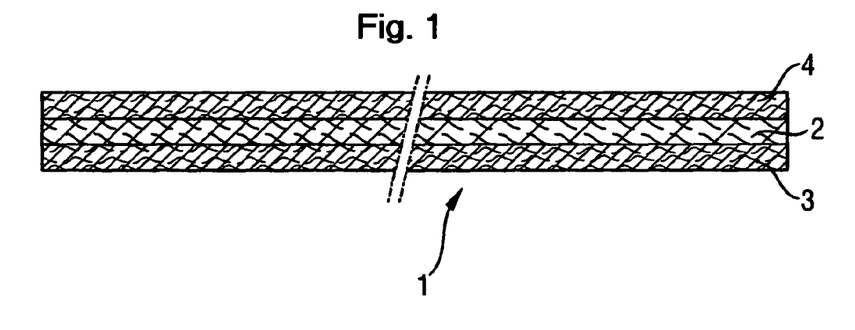
FIG. 1 shows a cross-sectional view of a preferred cleaning substrate according to the present invention.

Cleaning Substrate:

As shown in FIG. 1, the cleaning substrate 1 according to the present invention comprises an absorbent layer 2, a surface layer 3, and optionally an attachment layer 4. The cleaning substrate 1 is particularly designed for cleaning floors or other hard surfaces, and is preferably used in combination with an aqueous cleaning composition suitable for cleaning hard surfaces. The cleaning substrate 1 is preferably disposable.

The layers of the cleaning substrate 1 are preferably bonded together to form a unitary structure. The layers can be bonded in a variety of ways including, but not limited to, adhesive bonding, thermal bonding, ultra sonic bonding, and the like. The layers can be assembled to form a substrate either by hand or by a conventional line converting process known in the art. The resulting cleaning substrate 1 preferably has a substantial rectangular shape in the X-Y dimension, but other shapes are possible (e.g. a substantial elliptical-shape, eye-shape, round shape, triangular shape).

The absorbent layer 2 comprises any material capable of absorbing and retaining fluid during use. The absorbent layer 2 can be a mono-layer, or a multi-layer. Typically, the absorbent layer 2 comprises nonwoven fibers. The fibers useful herein can be hydrophilic, hydrophobic or can be a combination of both hydrophilic and hydrophobic fibers. As used herein, the term "hydrophilic" is used to refer to surfaces that are wettable by aqueous fluids deposited thereon. Hydrophilicity and wettability are typically defined in terms of contact angle and the surface tension of the fluids and solid surfaces involved. This is discussed in detail in the American Chemical Society publication entitled "Contact Angle, Wettability and Adhesion", edited by Robert F. Gould (Copyright 1964). A surface is said to be wetted by a fluid (i.e., hydrophilic) when either the contact angle between the fluid and the surface is less than 90°, or when the fluid tends to spread spontaneously across the surface, both conditions normally co-existing. Conversely, a surface is considered to be "hydrophobic" if the contact angle is greater than 90° and the fluid does not spread spontaneously across the surface. The particular selection of hydrophilic or hydrophobic fibers will depend upon the other materials included in the cleaning substrate 1, for instance in different absorbent layers. That is, the nature of the fibers will be such that the cleaning substrate 1 exhibits the necessary overall fluid absorbency. Suitable hydrophilic fibers for use in the present invention include cellulosic fibers, modified cellulosic fibers, rayon, polyester fibers such as hydrophilic nylon (HYDROFIL®). Suitable hydrophilic fibers can also be obtained by hydrophilizing hydrophobic fibers, such as surfactant-treated or silica-treated thermoplastic fibers derived from, for example, polyolefins such as polyethylene or polypropylene, polyacrylics, polyamides, polystyrenes, polyurethanes and the like. Suitable wood pulp fibers can be obtained from well-known chemical processes such as the Kraft and sulfite processes. It is especially preferred to derive these wood pulp fibers from southern soft woods due to their premium absorbency characteristics. These wood pulp fibers can also be obtained from mechanical processes, such as ground wood, refiner mechanical, thermomechanical, chemi-mechanical, and chemi-thermomechanical pulp processes. Recycled or secondary wood pulp fibers, as well as bleached and unbleached wood pulp fibers, can be used. Another type of hydrophilic fiber for use in the absorbent layer 2 is chemically stiffened cellulosic fibers. As used herein, the term "chemically stiffened cellulosic fibers" means cellulosic fibers that have been stiffened by chemical means to increase the stiffness of the fibers under both dry and aqueous conditions. Such means can include the addition of a chemical stiffening agent that, for example, coats and/or impregnates the fibers. Such means can also include the stiffening of the fibers by altering the chemical structure, e.g., by crosslinking polymer chains.

Where fibers are used as the absorbent layer 2 (or a constituent component thereof), the fibers may optionally be combined with a thermoplastic material. Upon melting, at least a portion of this thermoplastic material migrates to the intersections of the fibers, typically due to interfiber capillary gradients. These intersections become bond sites for the thermoplastic material. When cooled, the thermoplastic materials at these intersections solidify to form the bond sites that hold the matrix or web of fibers together in each of the respective layers. This may be beneficial in providing additional overall integrity to the cleaning substrate 1. Amongst its various effects, bonding at the fiber intersections increases the overall compressive modulus and strength of the resulting thermally bonded member. In the case of the chemically stiffened cellulosic fibers, the melting and migration of the thermoplastic material also has the effect of increasing the average pore size of the resultant web, while maintaining the density and basis weight of the web as originally formed. This can improve the fluid acquisition properties of the thermally bonded web upon initial exposure to fluid, due to improved fluid permeability, and upon subsequent exposure, due to the combined ability of the stiffened fibers to retain their stiffness upon wetting and the ability of the thermoplastic material to remain bonded at the fiber intersections upon wetting and upon wet compression. In net, thermally bonded webs of stiffened fibers retain their original overall volume, but with the volumetric regions previously occupied by the thermoplastic material becoming open to thus increase the average interfiber capillary pore size. Thermoplastic materials useful in the present invention can be in any of a variety of forms including particulates, fibers, or combinations of particulates and fibers. Thermoplastic fibers are a particularly preferred form because of their ability to form numerous interfiber bond sites. Suitable thermoplastic materials can be made from any thermoplastic polymer that can be melted at temperatures that will not extensively damage the fibers that comprise the primary web or matrix of each layer. Preferably, the melting point of this thermoplastic material will be less than about 190° C., and preferably between about 75° C. and about 175° C. In any event, the melting point of this thermoplastic material should be no lower than the temperature at which the thermally bonded absorbent structures, when used in the cleaning substrate 1, are likely to be stored. The melting point of the thermoplastic material is typically no lower than about 50° C. The thermoplastic materials, and in particular the thermoplastic fibers, can be made from a variety of thermoplastic polymers, including polyolefins such as polyethylene (e.g., PULPEX®) and polypropylene, polyesters, copolyesters, polyvinyl acetate, polyethylvinyl acetate, polyvinyl chloride, polyvinylidene chloride, polyacrylics, polyamides, copolyamides, polystyrenes, polyurethanes and copolymers of any of the foregoing such as vinyl chloride/vinyl acetate, and the like. Depending upon the desired characteristics for the resulting thermally bonded absorbent member, suitable thermoplastic materials include hydrophobic fibers that have been made hydrophilic, such as surfactant-treated or silica-treated thermoplastic fibers derived from, for example, polyolefins such as polyethylene or polypropylene, polyacrylics, polyamides, polystyrenes, polyurethanes and the like. The surface of the hydrophobic thermoplastic fiber can be rendered hydrophilic by treatment with a surfactant, such as a nonionic or anionic surfactant, e.g., by spraying the fiber with a surfactant, by dipping the fiber into a surfactant or by including the surfactant as part of the polymer melt in producing the thermoplastic fiber. Upon melting and resolidification, the surfactant will tend to remain at the surfaces of the thermoplastic fiber. Suitable surfactants include nonionic surfactants such as Brij® 76 manufactured by ICI Americas, Inc. of Wilmington, Del., and various surfactants sold under the Pegosperse® trademark by Glyco Chemical, Inc. of Greenwich, Conn. These surfactants can be applied to the thermoplastic fibers at levels of, for example, from about 0.2 to about 1 g. per sq. of centimeter of thermoplastic fiber. Suitable thermoplastic fibers can be made from a single polymer (monocomponent fibers), or can be made from more than one polymer (e.g., bicomponent fibers). With bicomponent fibers, the polymer comprising the sheath often melts at a different, typically lower, temperature than the polymer comprising the core. As a result, these bicomponent fibers provide thermal bonding due to melting of the sheath polymer, while retaining the desirable strength characteristics of the core polymer. The absorbent layer 2 may also comprise a HIPE-derived hydrophilic, polymeric foam. Such foams and methods for their preparation are described in U.S. Pat. No. 5,550,167 (DesMarais), issued Aug. 27, 1996; and in U.S. Pat. No. 5,563,179 (Stone et al.), filed Jan. 10, 1995.

The absorbent layer 2 preferably has a basis weight of from 60 g/m$^2$ to 300 g/m$^2$, more preferably from 80 g/m$^2$ to 200 g/m$^2$, most preferably from 90 g/m$^2$ to 160 g/m$^2$. It is preferably composed of from 50% to 90% wood pulp fibers or other cellulosic materials, 1% to 30% binders, and 1% to 30% of bicomponent fibers.

The surface layer 3 is the lower layer of the cleaning substrate 1 that contacts the soiled surface during cleaning, and interacts with the soil and the cleaning solution. As such, materials useful as the surface layer 3 must be sufficiently durable that the layer will retain its integrity during the cleaning process. In addition, when the cleaning substrate 1 is used in combination with a solution, the surface layer 3 must be capable of absorbing liquids and soils, and relinquishing those liquids and soils to the absorbent layer 2. This will ensure that the surface layer 3 will continually be able to remove additional material from the surface being cleaned. The surface layer 3 will, in addition to removing particulate matter, facilitate other functions, such as polishing, dusting, and buffing the surface being cleaned.

Figure 2:
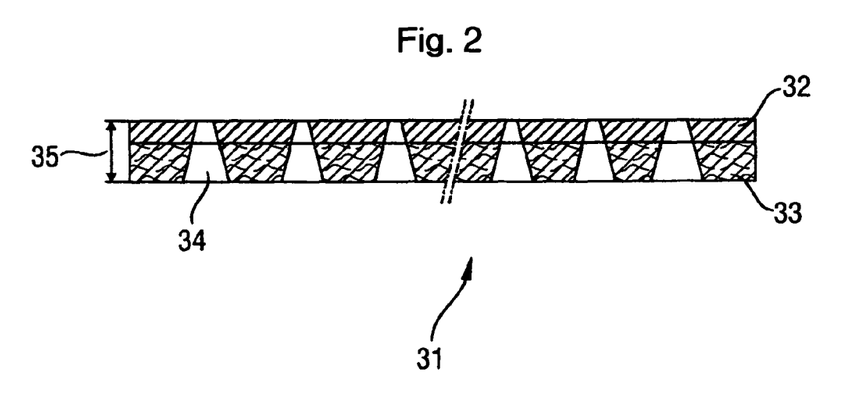
FIG. 2 shows a cross-sectional view of a preferred surface layer of the cleaning substrate.

As shown in FIG. 2, the surface layer 3 comprises a macro-apertured laminate 31 of a thermoplastic formed film 32 and a nonwoven layer 33. As used herein, "macro-apertures" 34 are apertures that are individually discernable when viewed by the human eye from about 45 cm. The macro-apertures may be, but not limited thereto, round, oval, pentagonal, hexagonal, octagonal, rectangular, or square. The macro-apertures may be created, for example, by thermo-mechanically perforating the laminate. As used herein, "formed film" means a film which is extruded onto a forming screen. For example, a thermoplastic material is extruded from a cast die or blown die into a thin film. While the film material is still in a semi-molten, malleable state a pressure is applied by differential pressure means, such as vacuum, blown air, etc. to the film material to have the film material form to a screen. Macro-apertured laminates of a thermoplastic formed film 32 and a nonwoven layer 33 can be made according to various methods known in the art. One particularly preferred method is described in U.S. patent application 2004/0161586, Cree et al.

The macro-apertured laminate 31 is positioned such that the thermoplastic formed film 32 is in direct contact with the absorbent layer 2, and the nonwoven layer 33 can contact the surface to be cleaned. The thermoplastic formed film 32 facilitates the fluid transport into the absorbent layer 2, and as such reduces the tendency to allow liquids to pass back through and rewet the surface being cleaned. The nonwoven layer 33 provides increased surface area in contact with the surface to be cleaned and thus improves though cleaning of soils. The macro-apertures 34 provide an easy avenue for larger particulate soil to move freely in and become entrapped within the absorbent layer 2 of the substrate.

The macro-apertured laminate 31 preferably comprises from 5 to 20 holes per square centimeter, more preferably from 7 to 15 holes per square centimeter. Preferably, the macro-apertures 34 are tapered or funnel-shaped apertures, meaning that the diameter at the lower end of the aperture (i.e. closer to the surface to be cleaned) is greater than the diameter at the upper end of the aperture (i.e. closer to the absorbent layer(s)), and actually exhibit a suctioning effect as the cleaning substrate 1 is moved across the surface being cleaned. This aids in moving liquid from the surface being cleaned to other layer(s) of the cleaning substrate 1, such as the absorbent layer(s). In addition, tapered or funnel-shaped apertures have an even greater tendency to prevent liquids from passing back through the scrubbing layer to the surface being cleaned once they have been transferred to other layers, such as the absorbent layer(s).

The thermoplastic formed film 32 preferably comprises synthetic materials such as polyolefins (e.g., polyethylene and polypropylene), polyesters, polyamides, synthetic cellulosics (e.g., Rayon®), and blends thereof. Such synthetic materials may be manufactured using known process such as carded, spunbond, meltblown, airlaid, needlepunched and the like. Preferably, the thermoplastic formed film 32 is hydrophobic. As such, it will be even more difficult for the absorbed liquid to pass back through and rewet the surface being cleaned. One example of a preferred thermoplastic formed film 32 is a 25 Penta polyethylene film comprising 25 pentagonal shaped apertures per linear inch from Tredegar Film Products (Richmond, Va., USA). In one embodiment, the thermoplastic formed film 32 is colored, or printed with graphics, brand information, and the like. As such, the visual aesthetics of the cleaning substrate 1 can be further improved.

The nonwoven layer 33 of the laminate can be made of any nonwoven fibers as previously described. However, particularly preferred are nonwovens known in the art as spunbond and carded thermo-bonded nonwovens. The nonwoven layer 33 is preferably a low basis weight, low caliper nonwoven layer 33. As nonwovens typically have a large capillary pore volume and pressure, the liquid which is absorbed by the nonwoven layer 33 will initially be stored within these pores, restricting the further transfer of liquid into the absorbent layer 2. As such, high basis weight or high capillary pressure nonwovens are not preferred for use in the surface layer 3. The basis weight is preferably from 8 to 20 gsm. Examples, but not limited thereto, of preferred nonwoven materials are 18 gsm carded thermo-bond from suppliers like Tenotex (Temo D'Isola, Italy) or BBA (Simpsonville, S.C., USA), 10-18 gsm spunbond from Atex Corp. (Settala, Italy), First Quality Nonwoven (New York, USA), or Avgol Industries (Tel Aviv, Israel).

The macro-apertured laminate 31 has a thickness 35 of from 0.5 mm to 1.5 mm, preferably from 0.7 mm to 1.2 mm, and even more preferably from 0.8 mm to 1.0 mm. The thickness 35 of the macro-apertured laminate 31 also is critical to the cleaning benefits of the cleaning substrate 1 of the present invention. In order to be effective in transporting the liquid from the hard surface into the absorbent layer 2, in addition to using a low basis weight nonwoven, the formed film-nonwoven laminate cannot be too thick, as the liquid needs to be transported through the laminate into the absorbent layer, against gravity.

The cleaning substrate 1 may further comprise one or more optional features.

Attachment layer: The cleaning substrate 1 can optionally have an attachment layer 4 that allows the substrate to be connected to an implement's handle or the mop head in preferred implements. The attachment layer 4 will be necessary in those embodiments where the absorbent layer 2 is not suitable for attaching the cleaning substrate 1 to the mop head of the handle. The attachment layer 4 may also function as a means to prevent fluid flow through the upper surface (i.e., the mop head-contacting surface) of the cleaning substrate 1, and may further provide enhanced integrity of the substrate. The attachment layer 4 may consist of a mono-layer or a multi-layer structure, so long as it meets the above requirements. In a preferred embodiment of the present invention, the attachment layer 4 will comprise a surface which is capable of being mechanically attached to the mop head by use of known hook and loop technology. In such an embodiment, the attachment layer 4 will comprise at least one surface which is mechanically attachable to hooks that are permanently affixed to the bottom surface of the mop head. To achieve the desired fluid imperviousness and attachability, it is preferred that a laminated structure comprising, e.g., a meltblown film and fibrous, nonwoven structure be utilized. In a preferred embodiment, the attachment layer 4 is a tri-layered material having a layer of meltblown polypropylene film located between two layers of spun-bonded polypropylene.

Superabsorbent material: The absorbent layer 2 should also preferably be capable of retaining absorbed material under typical in-use pressures to avoid "squeeze-out" of absorbed soil, cleaning solution, etc. To achieve desired total fluid capacities, it will be preferred to include in the absorbent layer 2 a material having a relatively high capacity (in terms of grams of fluid per gram of absorbent material). Therefore, in a preferred embodiment, the cleaning substrate 1 comprises a superabsorbent material. As used herein, the term "superabsorbent material" means any absorbent material having a g/g capacity for water of at least about 15 g/g, when measured under a confining pressure of 0.3 psi (2 kPa). Because a majority of the cleaning fluids useful with the present invention are aqueous based, it is preferred that the superabsorbent materials have a relatively high g/g capacity for water or water-based fluids. As such, absorbent cleaning substrates comprising superabsorbent materials have a synergistic effect when used in combination with the cleaning compositions of the present invention, since they are effectively removing water or water-based solutions from the floor thereby mitigating known side effects which water has on wood. Superabsorbent materials useful in the present invention include a variety of water-insoluble, but water-swellable (gelling) polymers capable of absorbing large quantities of fluids. Such polymeric materials are also commonly referred to as "hydrocolloids", and can include polysaccharides such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. Typically, superabsorbent gelling polymers useful in the present invention have a multiplicity of anionic functional groups, such as sulfonic acid, and more typically carboxy, groups. Most preferred polymer materials for use in making the superabsorbent gelling polymers are slightly network crosslinked polymers of partially neutralized polyacrylic acids and starch derivatives thereof. Most preferably, the hydrogel-forming absorbent polymers comprise from about 50 to about 95%, preferably about 75%, neutralized, slightly network crosslinked, polyacrylic acid (i.e. poly (sodium acrylate/acrylic acid)). Network crosslinking renders the polymer substantially water-insoluble and, in part, determines the absorptive capacity and extractable polymer content characteristics of the superabsorbent gelling polymers. Processes for network crosslinking these polymers and typical network crosslinking agents are described in greater detail in U.S. Pat. No. 4,076,663. Superabsorbent polymers are also beneficial when used in combination with the compositions of the present invention because they help keep the floor side of the substrate free of water, and significantly enhance the water or aqueous chemistry capacity of the absorbent disposable cleaning substrate 1. Additionally, the superabsorbent polymer ensures that solution removed from the substrate remains locked in the substrate, thus significantly improving drying time relative to all other cleaning systems (i.e., conventional cleaning systems, pre-moistened substrates and disposable absorbent substrates lacking the superabsorbent polymer). Such substrates are disclosed in U.S. Pat. Nos. 6,048,123, 6,003,191, 5,960,508, 6,101,661, and 6,601,261, U.S. Patent Application No. 2002/0166573, U.S. Patent Application No. 2002/0168216, U.S. Patent Application 2003/0034050, U.S. Patent Application 2003/0095826, U.S. Patent Application 2003/0126708, U.S. Patent Application 2003/0126709, U.S. Patent Application 2003/0126710, U.S. Patent Application 2003/0133740.

Figure 3:
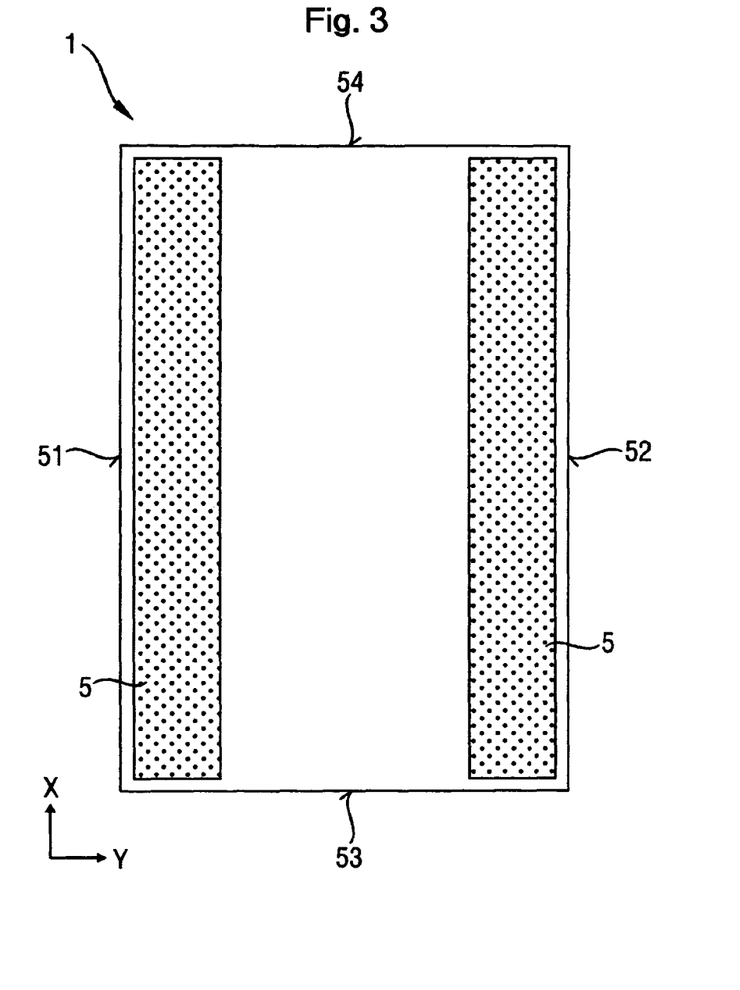
FIG. 3 shows an underneath view of a preferred embodiment of the cleaning substrate according to the present invention.

Strip of a textured material: As shown in FIG. 3, one or more strips 5 of a textured material may be attached to the lower surface of the surface layer 3. Textured materials may provide the additional benefit of any of scrubbing (to aid loosening of though soils), improved particle pick-up, improved hair pick-up, or any combination thereof. In one embodiment, a strip 5 may be attached adjacent to the leading edge 51, the trailing edge 52, or both edges of the cleaning substrate 1. The leading edge 51 of the cleaning substrate 1 is the edge which leads the cleaning substrate 1 when said substrate is moved in a forward direction. The trailing edge 52 of the cleaning substrate 1 is the edge which trails the cleaning substrate 1 when said substrate is moved in a forward direction. Alternatively, or additionally, a strip 5 may be attached to one or both of the side edges 53,54 of the cleaning substrate 1.

The textured material may be a nonwoven material having a three-dimensional surface pattern. Methods of creating three-dimensionality in nonwoven materials are well known in the art. One way to achieve this structure without using a lot of material is to use a nonwoven layer that has been formed on a three-dimensional screen. The nonwoven in a wet- or drylaid process will take on the shape of the screen and results in a thicker structure for the same basis weight since there is no material in apertured region. This becomes an effective way of increasing thickness and scrubbing capability of a material while minimizing the cost of increasing the basis weight. Another method for creating three-dimensionality is embossing. Other preferred methods for creating increased three-dimensionality, are described in WO application number 2004/020725, and U.S. Pat. No. 5,968,029, both assigned to The Procter & Gamble Company.

Examples of suitable materials include, but not limited thereto, Sofspan™ 120 or 200 from BBA (Simpsonville, S.C., USA) textured via the method according to U.S. Pat. No. 5,968,029, hydro-embossed 60 gsm nonwoven material from Green Bay Nonwovens (Wisconsin, USA), or low weight carded thermo-bond from Tenotex (Terno D'Isola, Italy).

The strip 5 may also take the form of a scrubbing strip. The scrubbing strip necessarily comprises an abrasive material, to remove tough stains. Suitable materials include those often used for making scouring pads, typically polymers or polymer blends with or without specific abrasives. Examples of suitable polymers include thermoplastic polymers such as polypropylene, high density polyethylene, polyesters (eg., polyethylene terephthalate), nylon, polystyrene, polycarbonate, and blends and copolymers thereof. An alternative to using materials found in typical scouring pads is to use brushes containing bristles to achieve scrubbing. Such bristles are typically composed of polymer or polymer blends, with or without abrasives. In the context of brushes, bristles made of nylon again are preferred because of rigidity, stiffness, and/or durability. A preferred nylon bristle is that commercially available from 3M Corp. under the trade name Tynex® 612 nylon. These bristles have shown less water absorption versus commercial Nylon 66. Reducing the ability of the present adhesive scrubbing strips to absorb water is important since water absorption decreases bristle stiffness and recovery while impacting scrubbing ability. Another approach is to use netting or scrim materials to form the scrubbing strip. Again, the netting or scrim is typically composed of a polymer or polymer blend, either with or without abrasives. The netting or scrim is typically wrapped around a secondary structure to provide some bulk. The shape of the holes in the netting can include, but is not limited to, a variety of shapes such as squares, rectangles, diamonds, hexagons or mixtures thereof. Typically, the smaller the area composed by the holes in the netting the greater the scrubbing ability. This is primarily due to the fact that there are more points where the scrim material intersects, as it is these intersection points that will contact the floor. An alternative to wrapping netting or scrim is to apply molten extruded polymers directly onto a secondary structure such as a nonwoven. Upon solidifying the polymer would create high point stiffer material as compared to the secondary nonwoven, and thereby provides scrubbing ability. Yet another alternative is for the scrubbing strip to comprise abrasive or coarse particulate material. A suitable particulate material comprises coarse inks available from Polytex® or coarse polymers from Vinamul, like Acrylic ABX-30. The scrubbing strip may be a monolayer or multilayer structure. Preferred scrubbing layers take the form of film materials, provided that they have the sufficient rigidity to withstand repeated scrubbing actions. Preferred film materials are pervious to liquids, and in particular liquids containing soils, and yet are non-absorbent and have a reduced tendency to allow liquids to pass back through their structure and rewet the surface being cleaned. Thus, the surface of the film tends to remain dry during the cleaning operation, thereby reducing filming and streaking of the surface being cleaned and permitting the surface to be wiped substantially dry.

Preferably the film material comprises a plurality of protrusions extending outwardly from the film surface and away from the body of the cleaning pad. Alternatively, or additionally, the film may comprise a plurality of apertures. The protrusions and/or apertures may be arranged in a pattern within the scrubbing strip. If so, the protrusions and/or apertures are preferably staggered relative to adjacent protrusions and/or apertures in order to enhance stain removing ability. Examples of preferred films are described in U.S. patent application 2005/0076936A1 (P&G case CM2790)

Figure 4:
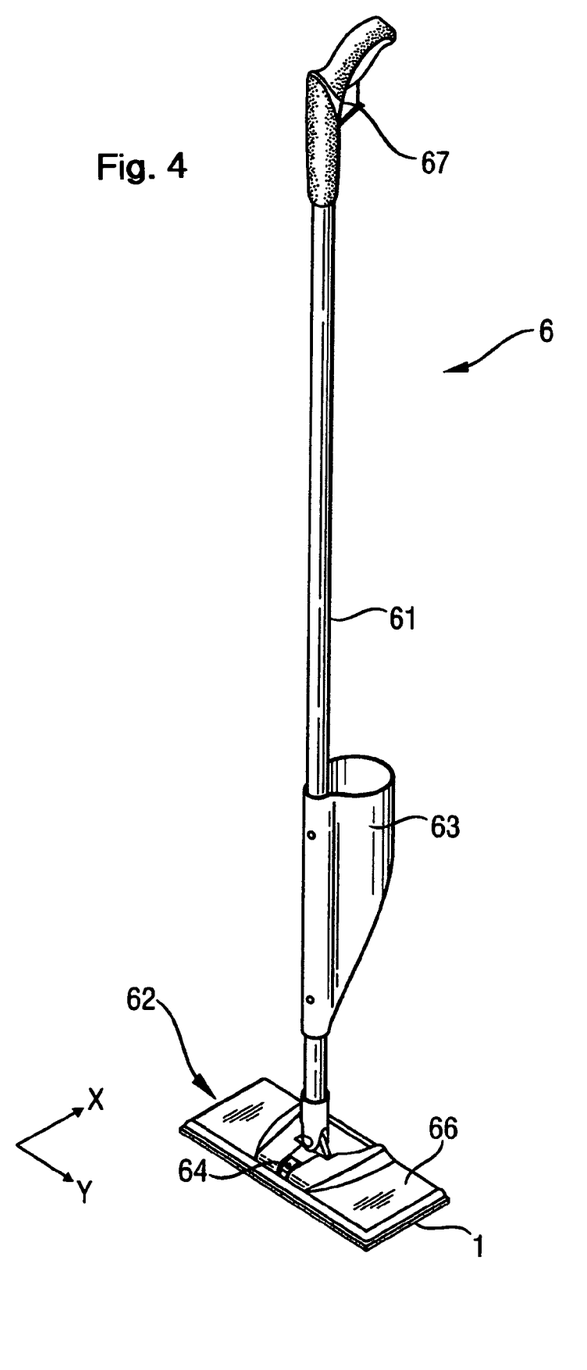
FIG. 4 shows a perspective view of a cleaning implement.

Cleaning Kit for Cleaning a Hard Surface:

The previously described cleaning substrate 1 is preferably used in combination with a cleaning implement. Therefore, in one embodiment, a cleaning kit for cleaning a hard surface comprises a cleaning implement, and a cleaning substrate 1 as described hereinbefore. An example of a preferred cleaning implement is shown in FIG. 4. The cleaning implement 6 comprises a handle 61, and a mop head 62 which is connected to said handle 61.

The cleaning substrate 1 can be used with either a cleaning implement 6 carrying a reservoir 63 of cleaning solution connected to a liquid delivery mechanism or with a cleaning implement 6 which does not have a liquid delivery mechanism. The liquid delivery mechanism can be any mechanism known in the art. Non-limiting examples of liquid delivery mechanism include electrically power pump, pressurized hand pump, aerosol mechanisms or gravity mechanism, such as the ones described in International patent application serial No. WO 01/22861, to Kunkler et al., published Apr. 5, 2001, in International patent application Serial No. WO 00/27271, to Policicchio et al., published May 18, 2000, in U.S. Pat. No. 5,779,155 to Ping et al., granted Jul. 14, 1998, and in copending U.S. patent application Ser. No. 60/409,263 to Höfte et al filed Sep. 9, 2002, all assigned to The Procter & Gamble Company. The liquid delivery mechanism is preferably in fluid communication with a nozzle 64 connected to the implement 6 and which is preferably located on the top surface 66 of the mop head. The liquid delivery mechanism can be actuated by a user by pulling or pushing on a trigger member 67 which is preferably located on the upper portion of the handle.

The cleaning substrate 1 can be removably attached about the mop head 62 of the implement 6 such that it is in contact with the hard surface during the cleaning operation. The cleaning substrate 1 can be releasably attached about the mop head 62 via any mechanism know in the art. Non-limiting examples of such mechanisms include grippers located on the top surface of the mop head which comprises a plurality of pie-shaped structures as described in U.S. Pat. No. 6,305,046 to Kingry et al., granted Oct. 23, 2001, as well as hook or loop fasteners located on the mop head to engage loop or hook fasteners located on the cleaning substrate 1 as described in International patent application Serial No. WO 00/27271, to Policicchio et al., published May 18, 2000. One skilled in the art will understand that when a cleaning substrate 1 is attached to attachment structures located on the top surface 66 of the mop head 62 and when the mop head 62 includes a nozzle 64 for dispensing the cleaning solution which is adjacent to the leading edge of the mop head 62, the cleaning substrate 1 preferably comprises a notch on at least one of the edges of the pad or wipe, preferably on both the leading and trailing edges of the pad. The notch allows the nozzle 64 to dispense the cleaning solution on the hard surface without being obstructed by the pad. The use of such a notch is disclosed in International Patent Application Serial No. WO 00/27271, to Policicchio et al., published May 18, 2000.

Any cleaning composition typically used for cleaning hard surfaces may be used. Examples of cleaning composition suitable for use in the present invention are described in WO 00/27271 (The Procter & Gamble Company). One example of a suitable cleaning composition is a composition comprising 0.05% of a $C_{10}$ alkyl polyglycoside, 3.00% ethanol, 1.0% of propylene glycol n-butyl ether, 0.01% of 2-amino-2-methyl-1-propanol, 0.06% perfume, some additional minor ingredients, and the remaining being water.

In one alternative embodiment, the cleaning substrate 1 of the present invention may be impregnated with a cleaning composition, to form a pre-moistened wipe.

Method of Cleaning a Hard Surface:

In one embodiment, the present invention encompasses a method of cleaning a hard surface, preferably a floor surface, comprising the steps of (i) applying a cleaning composition to said hard surface, and (ii) wiping the hard surface with the cleaning substrate 1. In another highly preferred embodiment, the composition is sprayed onto the surface, and consequently wiped using a cleaning implement as described above.

The benefits of the improved cleaning substrate 1 according to the present invention are shown in the following examples:

Examples:

The tough stain removal properties of the cleaning substrate of the present invention are assessed via image analysis.

Soil is prepared by mixing the following ingredients in a glass jar using a stir bar: 50 g acetone, 14 g vegetable oil, 10 g clay, and 2.5 g carbon black. Agitate prior to use.

A textured vinyl (roll form, Congoleum Vinyl Sheet, Prelude Nova Style, 64801, Style Caspian Solarian) is used as surface to be cleaned. The vinyl is first cleaned with isopropyl alchohol and paper towels or Magic Eraser™ until no soils are still visible. 0.5 g of the prepared soil is applied to the vinyl using a disposable pipette. The soil is spread across an area of about 8 inches by 4 inches (20.32 cm by 10.16 cm), using a sponge roller, and left to dry for 60 minutes. A baseline image is taken from the soiled surface using a digital camera (e.g. an 8 megapixel Nikon D1X), placed on a tripod.

The soiled surface is then cleaned using a commercially available Swiffer Wetjet® implement with the Wetjet® Advanced Cleaner solution. 2 ml of cleaning solution is applied with a pipette along an unsoiled narrow width of the floor surface next to the soiled area. A cleaning substrate is attached to the cleaning implement following normal usage instructions. The soiled area is then cleaned by moving the cleaning substrate attached to the implement at consistent speed for two complete strokes forward and back. A new picture is taken from the cleaned area.

The pictures are then transferred to image analysis software (e.g. Image Pro SoftWare from Media Cybernetics). The area to be analysed is selected, and converted to gray scale (e.g. gray scale 8). The contrast is adjusted to maximum in order to highlight the remaining soils on the cleaned area. The software is then used to count the number of pixels (which corresponds to the amount of soil remaining on the surface).

The cleaning performance is then determined by comparing the amount of soil of the uncleaned surface with the amount of soil of the cleaned surface.

For the test, a commercially available Wetjet® pad (with the flaps removed) is compared with a cleaning substrate having a surface layer comprising a macro-apertured laminate of a 10 gsm spunbond nonwoven (First Quality Nonwoven (New York, USA)) and a thermoplastic formed film (25 Penta polyethylene from Tredegar Film Products (Richmond, Va., USA)) with 11 apertures per square centimeter and a laminate thickness of 0.85 mm The test is replicated 3 times.

The Wetjet® pad shows a reduction of soil of 66% on average, versus 96% of the cleaning substrate according to the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning substrate comprising
    a. an absorbent layer comprising a superabsorbent material;
    b. a surface layer comprising a macro-apertured laminate of a thermoplastic formed film and a nonwoven layer;
    c. wherein said thermoplastic formed film is in direct contact with said absorbent layer, and said macro-apertured laminate has a thickness from 0.5 mm to 1.5 mm and said macro-apertured laminate comprises from 5 to 20 holes per square centimeter, said macro-apertures tapering from a greater diameter closer to a surface to be cleaned to a lesser diameter juxtaposed proximal to said absorbent layer.

2. A cleaning substrate according to claim 1, wherein said macro-apertured laminate has a thickness from 0.7 mm to 1.2 mm.

3. A cleaning substrate according to claim 1, wherein said macro-apertured laminate has a thickness from 0.8 mm to 1 mm.

4. A cleaning substrate according to claim 1, wherein said macro-apertured laminate comprises from 7 to 15 holes per square centimeter.

5. A cleaning substrate according to claim 1, wherein said nonwoven layer of said macro-apertured laminate has a basis weight from 8 gsm to 20 gsm.

6. A cleaning substrate according to claim 1, wherein said nonwoven layer of said macro-apertured laminate is a spunbond or a carded thermo-bond.

7. A cleaning substrate according to claim 1, wherein said cleaning substrate further comprises an attachment layer.

8. A cleaning substrate according to claim 1, further comprising at least one strip of a textured material attached to the underside of said surface layer.

9. A cleaning substrate according to claim 1, wherein said cleaning substrate is impregnated with a cleaning composition.

10. A cleaning kit comprising:
    a. a cleaning implement comprising a mop head; and
    b. a cleaning substrate according to claim 1.

11. A cleaning kit according to claim 10, further comprising a cleaning composition.

12. A method of cleaning a hard surface, comprising the steps of:
    a. applying a cleaning composition to said hard surface; and
    b. wiping said hard surface with a cleaning substrate according to claim 1.

* * * * *